United States Patent
Reddy A V et al.

(10) Patent No.: US 11,567,687 B2
(45) Date of Patent: Jan. 31, 2023

(54) UNINTERRUPTED BLOCK-BASED RESTORE USING A VIRTUAL CONTAINER

(71) Applicant: EMC IP Holding Company LLC, Hopkinton, MA (US)

(72) Inventors: Mahesh Reddy A V, Bangalore (IN); Chetan Battal, Bangalore (IN); Mahantesh Ambaljeri, Bangalore (IN); Swaroop Shankar D H, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 193 days.

(21) Appl. No.: 16/776,447

(22) Filed: Jan. 29, 2020

(65) Prior Publication Data
US 2021/0232319 A1   Jul. 29, 2021

(51) Int. Cl.
*G06F 3/06* (2006.01)
*G06F 9/455* (2018.01)

(52) U.S. Cl.
CPC .............. *G06F 3/065* (2013.01); *G06F 3/064* (2013.01); *G06F 3/0619* (2013.01); *G06F 3/0647* (2013.01); *G06F 3/0656* (2013.01); *G06F 3/0673* (2013.01); *G06F 9/45558* (2013.01)

(58) Field of Classification Search
None
See application file for complete search history.

(56) References Cited

U.S. PATENT DOCUMENTS

| | | | | |
|---|---|---|---|---|
| 7,133,985 B1* | 11/2006 | Haase | ................ | G06F 11/2082 711/162 |
| 7,650,533 B1* | 1/2010 | Saxena | ............... | G06F 11/1461 714/6.12 |
| 2006/0106971 A1* | 5/2006 | Mahar | .................... | G06F 3/064 711/100 |
| 2011/0125717 A1* | 5/2011 | Manson | ............. | G06F 11/1458 707/679 |

\* cited by examiner

*Primary Examiner* — Michael Alsip
(74) *Attorney, Agent, or Firm* — Womble Bond Dickinson (US) LLP

(57) ABSTRACT

For restoring data, a system with uninterrupted block-based restore has a hybrid container. The hybrid container has an operational buffer and a virtual container unit. The system receives blocks of data from a target device into the hybrid container and sends the blocks of data from the hybrid container to a destination device for a restore session. The system writes information about the blocks of data into one or more virtual containers. If there is an abort of the restore session, the system freezes state of the hybrid container and the virtual container(s). For a next restore session that resumes from where the aborted restore session stopped, the system resumes receiving blocks of data from the target device into the hybrid container and sends only leftover blocks of data to the destination device in accordance with the information in the virtual container(s).

20 Claims, 7 Drawing Sheets

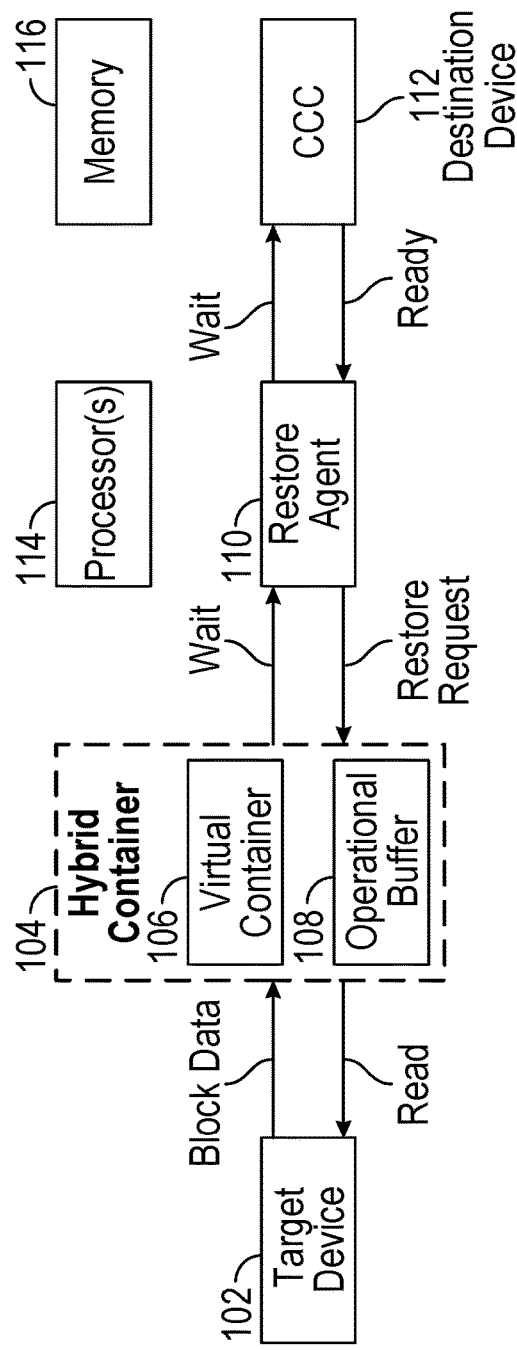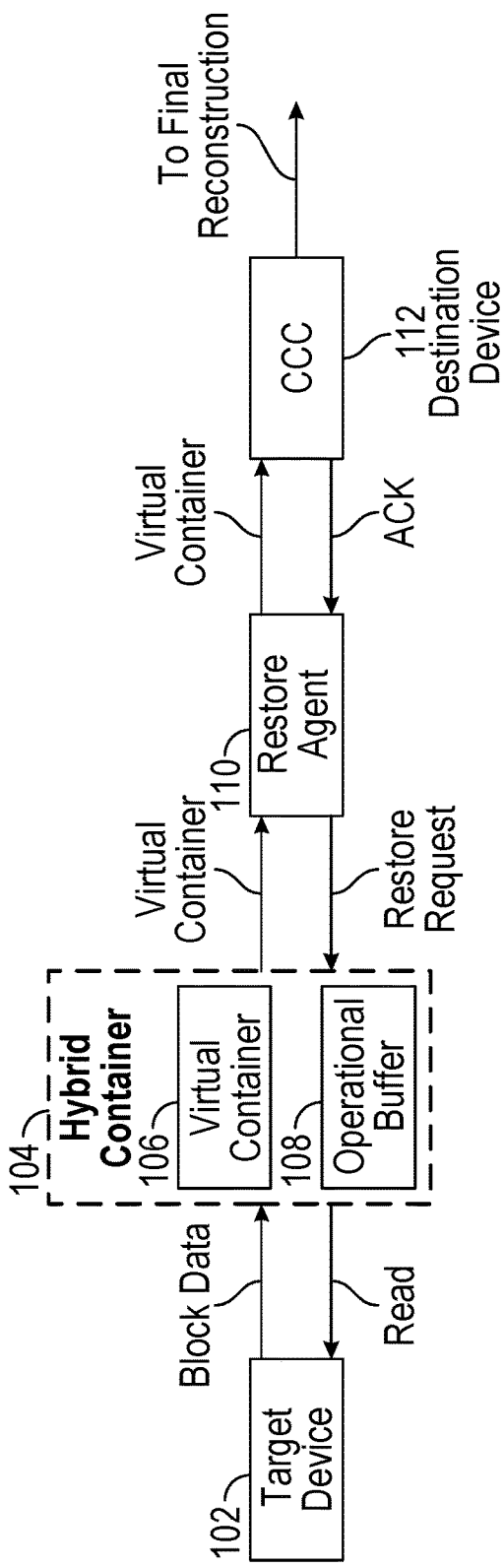
FIG. 1
FIG. 2

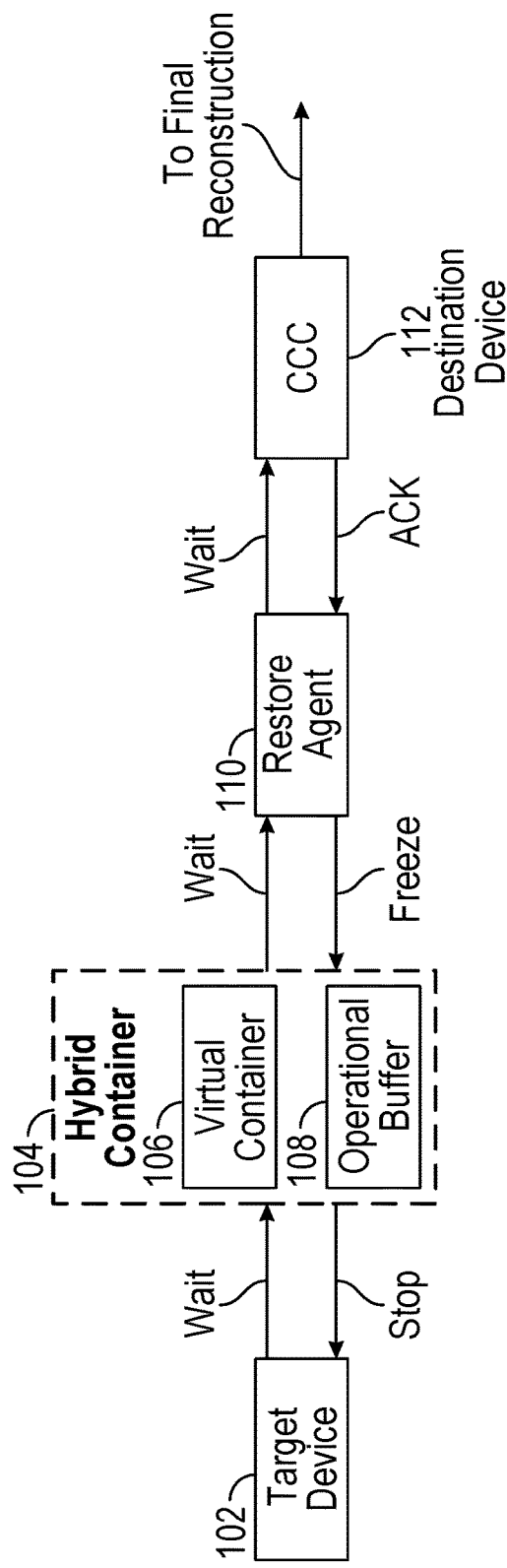
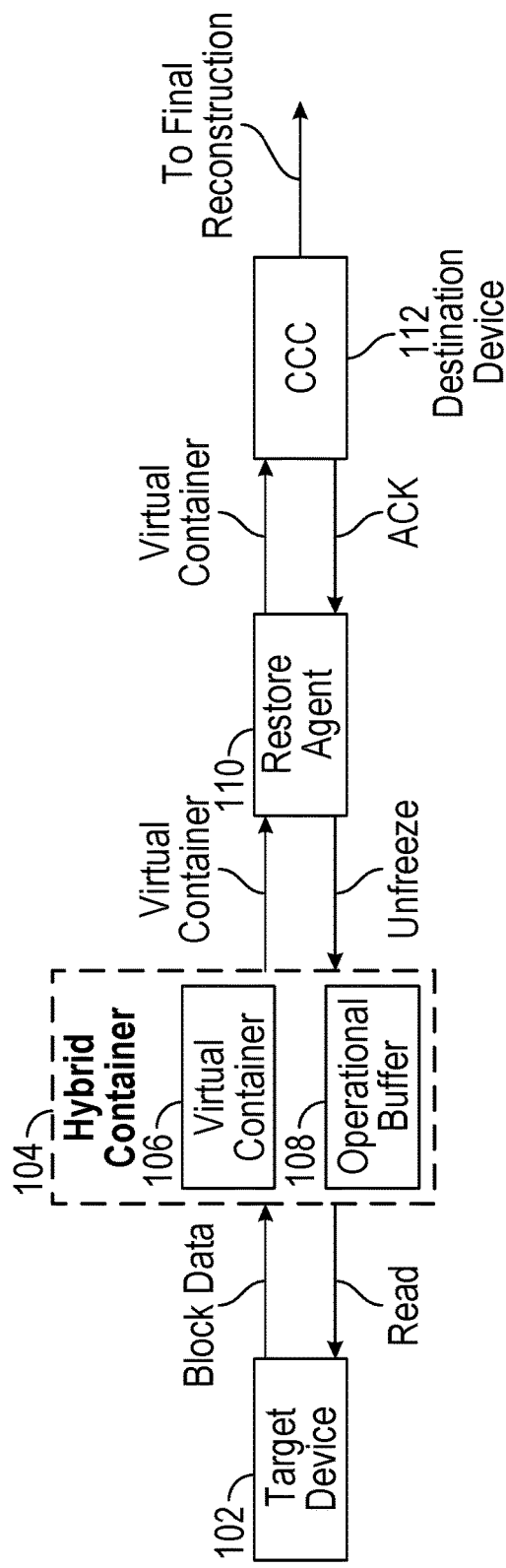

UNINTERRUPTED BLOCK-BASED RESTORE USING A VIRTUAL CONTAINER

BACKGROUND

Regular backups protect computers and data systems from data loss, worldwide. When backup data is available, a restore session restores the data to a system that has experienced a loss. Unexpected events causing restores to abort are problematic. The need to start successive restores from the point of interrupt to avoid a restore window increase has become of great interest nowadays. For example, while a restore is in progress, and due to some random unintended event, the restore could be aborted abruptly, causing the data to be half written back to the destination device. The restore would then be rolled back after this point resulting in unusable data and a corrupted production environment. Such a situation would also lead to an increase of restore window. Another problem resulting from an aborted restore is that the restore must be restarted from the beginning even though there is some portion of the restore that was already completed.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 1 illustrates step 1 of a restore process performed by a restore agent and a hybrid container that has a virtual container unit and an operational buffer, in an embodiment.

FIG. 2 illustrates step 2 of the restore process, in an embodiment.

FIG. 3 illustrates step 3 of the restore process, in an embodiment.

FIG. 4 illustrates step 4 of the restore process, in an embodiment.

DETAILED DESCRIPTION

Figure 5:
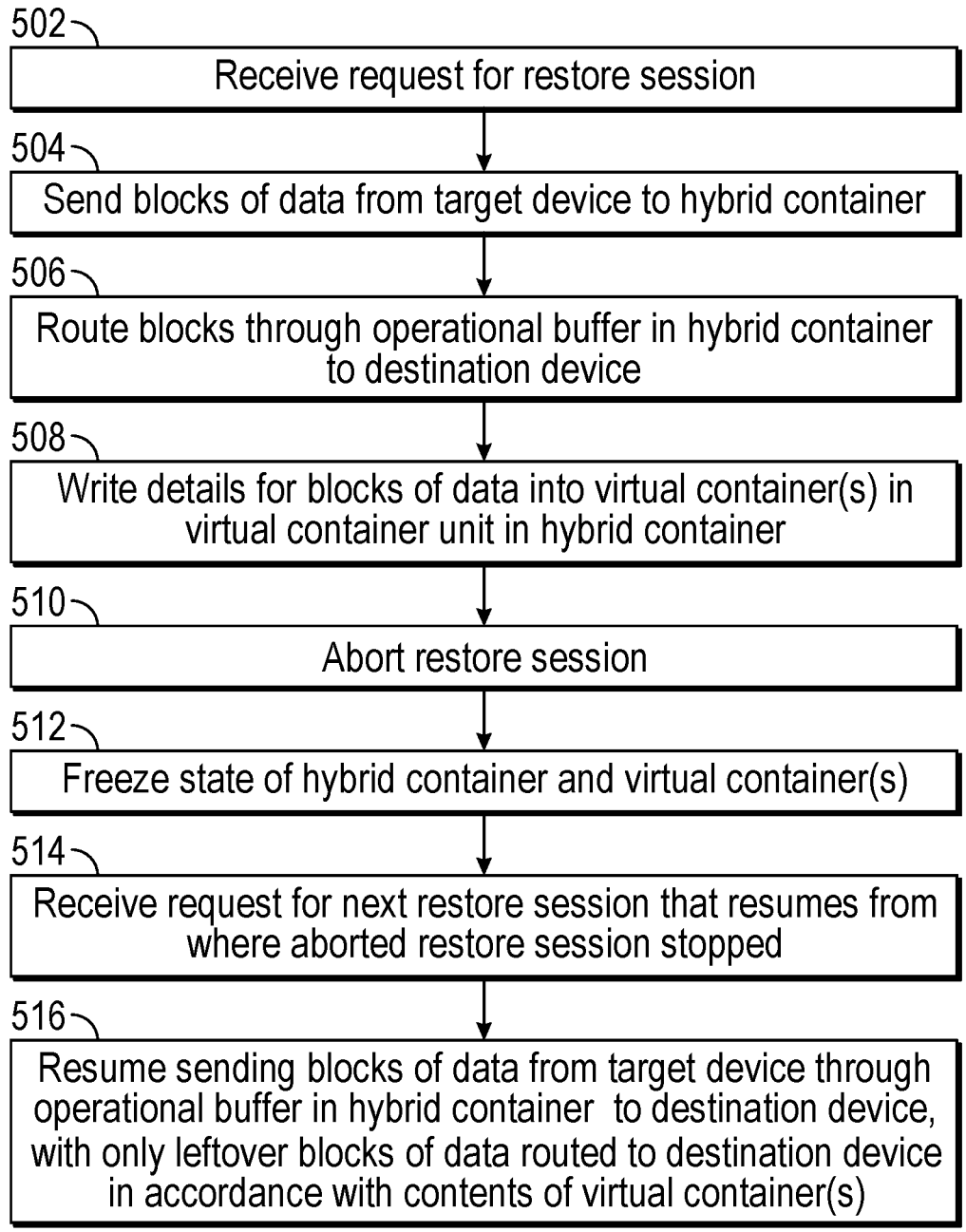
FIG. 5 is a flow diagram of a method for uninterrupted block-based restore using a virtual container, which can be practiced by systems described herein.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A hybrid container for restores, and a related restore system, are described herein in various embodiments that mitigate the risk of restore window increase after an abort during a restore session. As an example scenario of usage of the hybrid container and restore system, a restore administrator or backup administrator would prefer a backup and restore application that provides the SLA (service level agreement) of achieving any successive restore from an improper, random or unintended abort to be continuous in nature. The aim of a backup/restore administrator during such scenarios is to have the successive restore started from the point of abort, without the necessity of having to restart from the beginning, to avoid any further increase in the restore window.

To satisfy the same, a data probe approach is used to identify the abrupt abort during a restore operation and ensure a safe uninterrupted restore from the aborted point in the next restore session (or, resumption of the aborted restore session). Various embodiments of a hybrid container and restore system, a method, and a tangible computer-readable media described herein use a virtual container map to track the blocks that are being read from the target device. The virtual container contains fundamental details of each block and its associated container. This virtual container is used in combination with an operational buffer to form a hybrid container. This hybrid container is utilized to ensure an uninterrupted restore service.

Embodiments of the hybrid container and restore system provide a solution to avoid an increase in the restore window due to an unexpected abort. The solution also ensures an uninterrupted restore service after an unintended termination of the restore session to prevent a corrupted production data.

A restore session begins with the legacy recovery agent, i.e., the restore agent, receiving the restore request. The restore agent routes the restore request for the index that has been requested by the backup/restore administrator. The index (e.g., for all the blocks that need to be restored) is routed via the hybrid container to the target device, which is the source for the restore. The target device sends blocks of data, which have information or details about the blocks that may be termed parental details. These details are recorded at the hybrid container unit, in the virtual container(s) in the virtual container unit. The virtual container unit is a dynamic collection of information about the blocks from the target device. In various embodiments, the virtual container unit has one virtual container with information about all of the blocks that have been restored to a destination device, one virtual container for each block, multiple virtual containers with each virtual container corresponding to multiple blocks, or some combination of containers each corresponding to one or more blocks. If there is an unexpected abort event, the virtual container unit is frozen immediately and the restore session is terminated. In the consecutive restore session (or resumption of the aborted restore session), the restore request is routed to the target device and the virtual container unit bypasses the blocks that are already in the virtual container unit and thereby ensures an uninterrupted restore session. That is, during this next restore session the system sends only leftover blocks that were not previously restored, to the destination device. The following process, described in a series of steps, illustrates one embodiment. Variations, in which various actions are performed in a related series of steps are readily devised in keeping with the teachings herein.

In one embodiment, a system with uninterrupted block-based restore has a hybrid container and one or more processors. The hybrid container includes an operational buffer and a virtual container unit. The one or more processors are to receive blocks of data from a target device into the hybrid container and send the blocks of data from the hybrid container to a destination device, responsive to receiving a request for a restore session to restore data to the destination device. The one or more processors are to write information about the blocks of data into one or more virtual containers in the virtual container unit, responsive to receiving the blocks of data by the hybrid container. The one or more processors are to freeze state of the hybrid container and the one or more virtual containers, responsive to an abort of the restore session. The one or more processors are to resume receiving blocks of data from the target device into the hybrid container, responsive to a next restore session that resumes from where the aborted restore session stopped, sending only leftover blocks of data to the destination device in accordance with the information in the one or more virtual containers.

In one embodiment, there is a method for uninterrupted block-based restore using a virtual container. The method includes sending blocks of data from a target device to a hybrid container, and from the hybrid container to a destination device, responsive to receiving a request for a restore session. The hybrid container includes an operational buffer and a virtual container unit. The method includes writing details for the blocks of data into one or more virtual containers in the virtual container unit, responsive to receiving the blocks of data by the hybrid container. The method includes freezing state of the hybrid container and the one or more virtual containers, responsive to an abort of the restore session. The method includes resuming the sending the blocks of data from the target device to the hybrid container, responsive to a next restore session that resumes from where the aborted restore session stopped. Only the leftover blocks of data are routed to the destination device in accordance with contents of the one or more virtual containers.

In one embodiment, a tangible, non-transitory, computer-readable media has instructions. The instructions, when executed by a processor, cause the processor to perform various actions. The processor routes blocks of data from a target device through a hybrid container to a destination device, responsive to receiving a request for a first restore session. The hybrid container includes an operational buffer and a virtual container unit. The processor writes details for the blocks of data into one or more virtual containers in the virtual container unit, responsive to routing the blocks of data through the hybrid container. The processor freezes state of the hybrid container, including the one or more virtual containers, responsive to an abort of the first restore session. The processor resumes routing the blocks of data from the target device through the hybrid container to the destination device, responsive to a second restore session that resumes from where the aborted first restore session stopped. Only leftover blocks of data are routed to the destination device in accordance with contents of the one or more virtual containers.

FIG. 1 illustrates step 1 of a restore process performed by a restore agent 110 and a hybrid container 104 that has a virtual container unit 106 and an operational buffer 108, in an embodiment. Each of these components can be implemented in hardware, firmware, or software executing on one or more processors 114, using memory 116, or combinations thereof, in various embodiments. The target device 102 has storage memory. Together, the hybrid container 104 and the restore agent 110 form a restore system, in one embodiment. Yet another embodiment includes the target device 102. Yet another embodiment of a restore system includes the destination device 112, labeled "CCC" for Conditional Construction Container. Further combinations of these components for embodiments of a restore system are readily devised.

In step 1, the restore agent 110, upon receiving a restore request, routes the restore request to the hybrid container 104, where the operational buffer 108 routes the restore request to the target device 102. The target device 102 starts sending the blocks of data to the hybrid container 104, for the restore session.

FIG. 2 illustrates step 2 of the restore process, in an embodiment. In step 2, the hybrid container 104, upon receiving the blocks of data retrieves the appended parental details (i.e., information about the blocks) and starts creating virtual container(s) in the virtual container unit 106 for the blocks. The blocks are sent through the operational buffer 108, to the destination device 112. For every batch of blocks, containers are either created in the virtual container unit 106, or the information about the blocks is appended for an already created virtual container in the virtual container unit 106, in various embodiments.

The container is called a virtual container because it is not actually a container, but a homogenous grouping of information about a block, or each set of blocks, to give a feel of a container. Whereas a standard container would contain the block or blocks themselves, i.e. the data of the block(s), the virtual container contains only information about the block (s). The block data or block itself from the target device 102 is routed through the operational buffer 108 to the destination device 112 to restore the data and so does not route through in the virtual container.

In one embodiment, the Conditional Construction Container as the destination device 112 serves as a constructor during the final restoration stage, conditionally. During the last stage of a restore, the Conditional Construction Container holds the data intact and proceeds to the final reconstruction only when the complete data block set has been received by the Conditional Construction Container, as indicated by the restore agent. For example, the restore agent could indicate to the Conditional Construction Container that the last block of data has been sent, and the Conditional Construction Container can proceed with the restore at that time. The Conditional Construction Container holds data, as a block based container, and waits until the required conditions, such as a signal from the restore agent, or a signal from the target device or any other external device. When a signal indicating required conditions have been met, the Conditional Construction Container reconstructs the data within in the target host or location as indicated by the restore agent. The intention behind using the Conditional Construction container is to ensure that there is no partial restore which could corrupt data in production. The final reconstruction can be the completion of the restore process, or data reconstruction from compressed or deduplicated data, in various embodiments. The completion stage of the restore can be defined as that stage where the actual compressed or deduplicated data is written to its original form on the production or target location, in such embodiments.

The final reconstruction of deduplicated or compressed data is a phase of a restore, where a complete set of deduplicated or compressed data blocks is reconstructed to original uncompressed form and written back to the production in a user usable format. This works by decompressing or decrypting compressed or deduplicated data and writing the retrieved blocks of data onto the target location on the host. With the Conditional Construction Container used for reconstruction, an unexpected abort during a restore session does not interrupt the final reconstruction process of the data restore. The final reconstruction process waits until after the restore session or, if interrupted, the subsequent restore session or resumption of the restore session, completes sending all relevant blocks of data to the Conditional Construction Container.

FIG. 3 illustrates step 3 of the restore process, in an embodiment. In step 3, if there is an unexpected abort during the restore session, the restore agent 110 freezes the state of the hybrid container 104 and terminates the restore session. The virtual container(s) are in a frozen state in the virtual container unit 106 in the hybrid container 104.

FIG. 4 illustrates step 4 of the restore process, in an embodiment. In step 4, during the next restore session, the restore agent repeats the step 1 actions, but the hybrid container 104 bypasses the already completed blocks as indicated by the contents of the virtual container unit 106 and the restore agent 110, and starts to route only the leftover blocks, discarding the others. The so far completed blocks are copied onto the destination device 112 labeled CCC, until the restore agent 110 indicates for a final reconstruction. This way the system ensures an uninterrupted restore service.

FIG. 5 is a flow diagram of a method for uninterrupted block-based restore using a virtual container, which can be practiced by systems described herein. The method can be practiced by one or more processors, such as a processor in a backup/restore system. In an action 502, the system receives a request for a restore session. The request could be from a system administrator, or backup administrator or restore administrator. Or, the request could be generated by a system component that recognizes a data loss.

In an action 504, the system sends blocks of data from the target device to the hybrid container. This could be in response to the hybrid container sending reads or data requests to the target device, which is a restore source. In an action 506, the system routes blocks of data through the operational buffer in the hybrid container, to the destination device. In an action 508, the system writes details (i.e., information) for blocks of data into one or more virtual containers in the virtual container unit, in the hybrid container. These details may be termed parental details for the blocks. In an action 510, the restore session is aborted. In an action 512, the system freezes the state of the hybrid container and the virtual container(s).

In an action 514, the system receives a request for the next restore session that resumes from where the aborted restore session stopped. In an action 516, the system resumes sending blocks of data from the target device through the operational buffer in the hybrid container to the destination device, with only leftover blocks of data routed to the destination device in accordance with contents of the virtual container(s) in the virtual container unit.

In various embodiments, there are various mechanisms for how the restore system routes only the leftover blocks of data to the destination device. Generally, the target device sends the blocks of data to the hybrid container, where the data blocks are routed through the operational buffer, and the restore agent routes the blocks of data from the operational buffer of the hybrid container to the destination device. The system determines which blocks to route from the target device to the destination device in a resumed or next restore session by consulting with the virtual container(s) and determining which blocks are leftover, i.e., have not yet been restored to the destination device.

In one embodiment, the hybrid container issues reads or block requests to the target device, and these reads are for only the leftover blocks of data according to the contents of the virtual container(s) in the virtual container unit. That is, the hybrid container determines, based on the contents of the virtual container(s), which blocks of data have not yet been restored to the destination device, and reads only those blocks (i.e., the leftover blocks) from the target device for the restore process.

In one embodiment, the hybrid container directs the target device not to send blocks of data that have been previously sent through the operational buffer to the destination device during the restore session. This direction is determined according to the contents of the virtual container(s).

In one embodiment, the hybrid container discards blocks of data that are received at the hybrid container from the target device, when such blocks have been sent previously through the operational buffer to the destination device during a restore session. The hybrid container determines which blocks to discard, based on the contents of the virtual container(s).

In one embodiment, the restore agent directs the hybrid container to bypass blocks of data previously sent through the operational buffer to the destination device during a restore session. This direction is determined according to the contents of the virtual container(s).

Various embodiments of restore systems are described below. Storage systems used therein for backup destination and restore source, or restore destination, could have various forms of storage memory and architecture, and may use compression, deduplication, encryption, error correction and/or other storage system processes in various combinations. Further embodiments of these restore systems are readily devised, with components in separate devices or combined in various devices. For example, the operational buffer and the virtual container unit could be split into different components or integrated with other components so that the hybrid container 104 is a distributed component.

Figure 6A:
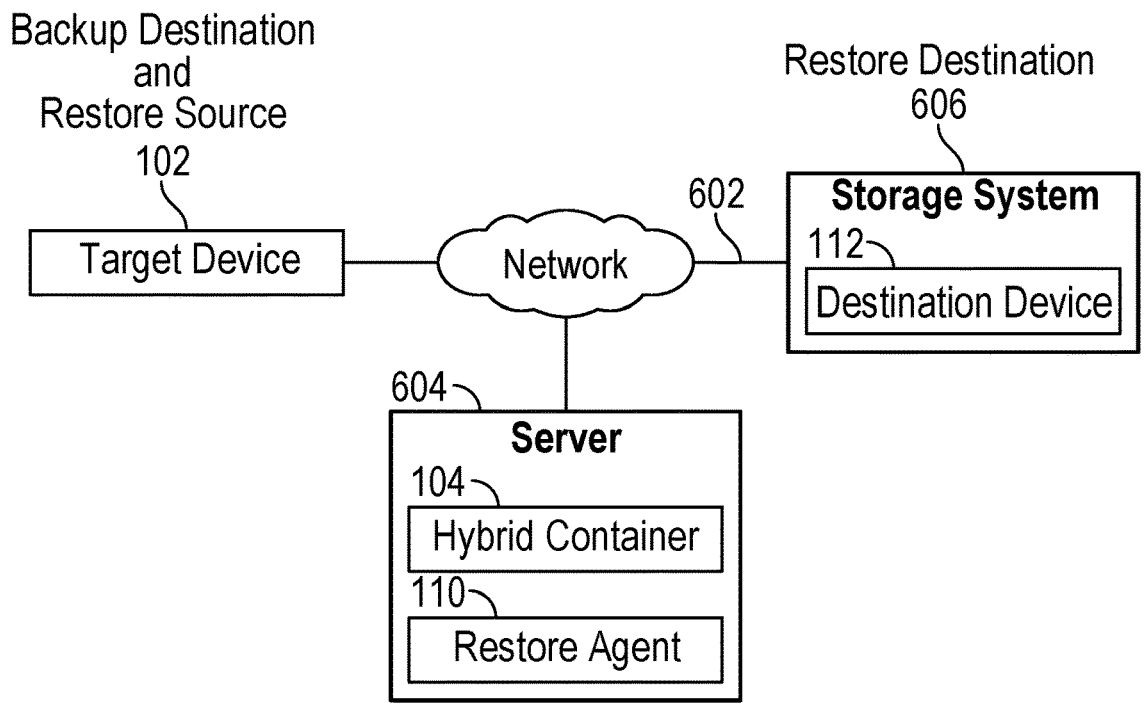
FIG. 6A illustrates an embodiment of a restore system, with a restore agent and a hybrid container in a server on a network, performing a restore from a target device as a restore source to a destination device in a storage system as a restore destination.

FIG. 6A illustrates an embodiment of a restore system, with a restore agent 110 and a hybrid container 104 in a server 604 on a network 602, performing a restore from a target device 102 as a restore source to a destination device 112 in a storage system 606 as a restore destination. The target device 102 was previously a backup destination, and has the desired backup data blocks for the restore process. Components in this and further embodiments communicate over a network 602, which could be wired or wireless, or a bus or other communication path in variations. In further embodiments, the restore agent 110, the hybrid container 104, and/or the separate components of the hybrid container 104 (e.g., the virtual container unit 106 and the operational buffer 108) could be integrated with a restore source or a restore destination, in various combinations.

Figure 6B:
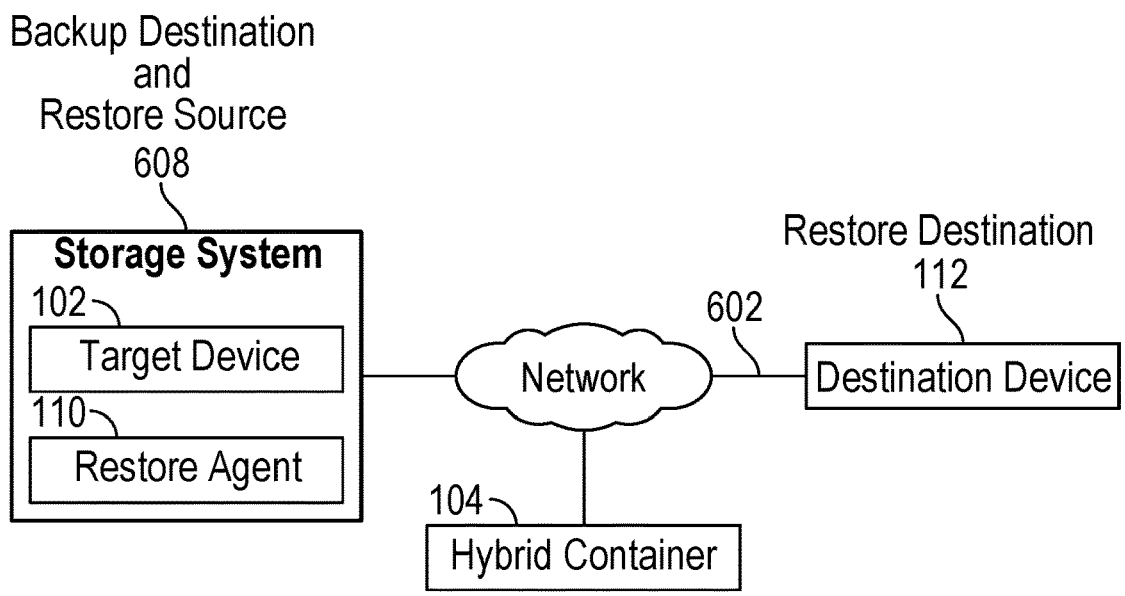
FIG. 6B illustrates an embodiment of a restore system, with a restore agent integrated with a storage system as a restore source, and a hybrid container on a network, performing a restore from a target device to a destination device as a restore destination.

FIG. 6B illustrates an embodiment of a restore system, with a restore agent 110 integrated with a storage system 608 as a restore source, and a hybrid container 104 on a network 602, performing a restore from a target device 102 in the storage system 608 to a destination device 112 as a restore destination. The hybrid container 104 is shown as a network device or part of a network device on the network 602 in this embodiment.

Figure 6C:
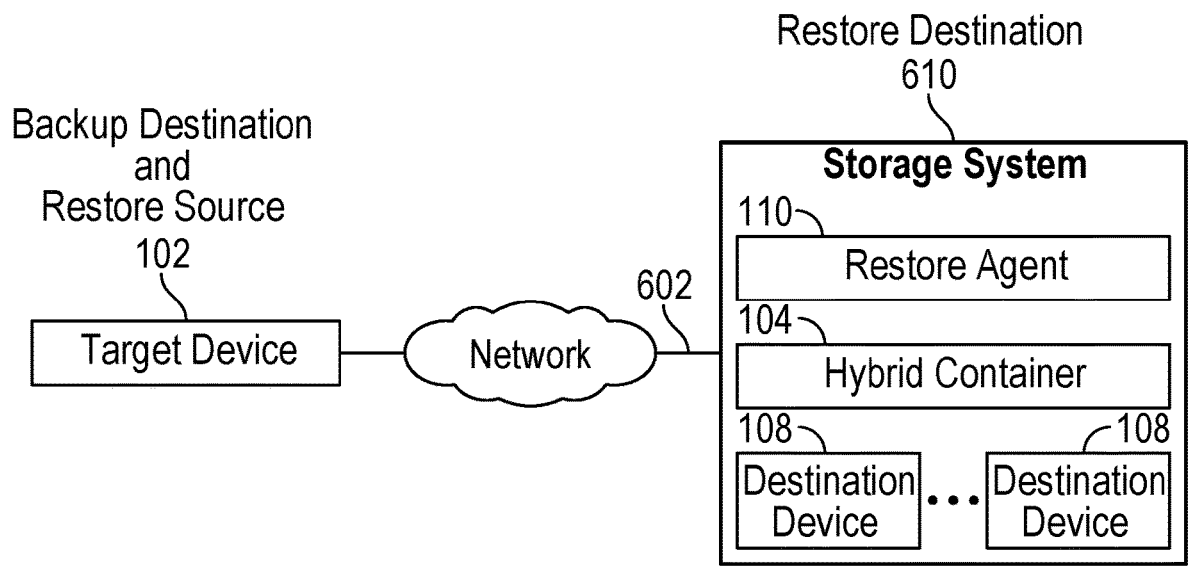
FIG. 6C illustrates an embodiment of a restore system, with a restore agent and a hybrid container integrated with a storage system as a restore destination, performing a restore from a target device as a restore source to a destination device in the storage system.

FIG. 6C illustrates an embodiment of a restore system, with a restore agent 110 and a hybrid container 104 integrated with a storage system 610 as a restore destination, performing a restore from a target device 102 as a restore source to a destination device 112 in the storage system 610. The hybrid container 104 or the restore agent 110 routes the restored data blocks to one or more of the destination devices 112 in the storage system 610.

Figure 6D:
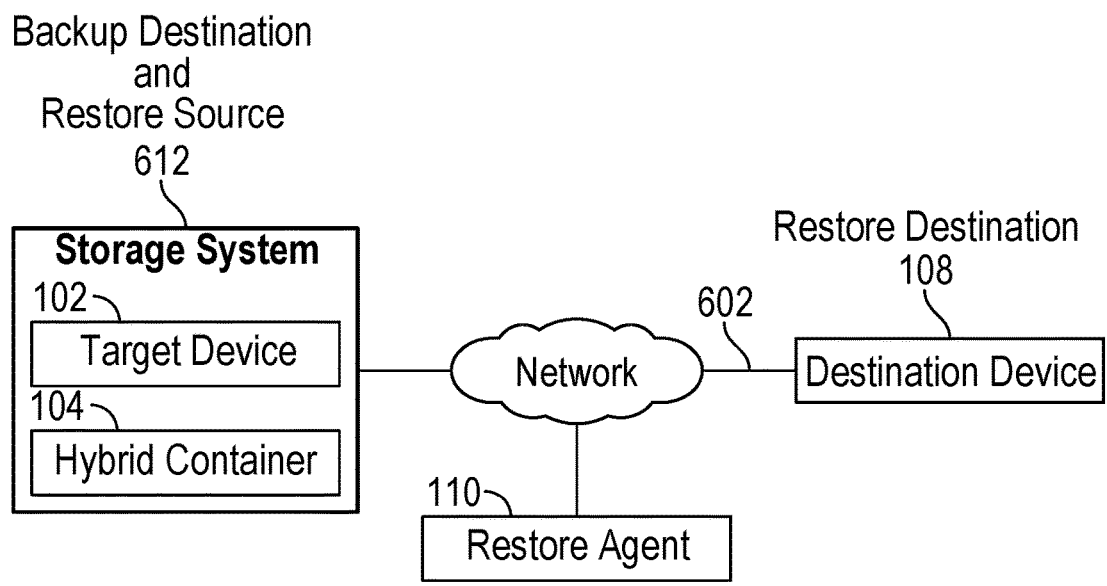
FIG. 6D illustrates an embodiment of a restore system, with a hybrid container integrated with a storage system as a restore source, and a restore agent on a network, performing a restore from a target device in the storage system to a destination device as a restore destination.

FIG. 6D illustrates an embodiment of a restore system, with a hybrid container 104 integrated with a storage system 612 as a restore source, and a restore agent 110 on a network 602, performing a restore from a target device 102 in the storage system 612 to a destination device 112 as a restore destination. The restore agent 110 communicates with the hybrid container 104 over the network 602 and so directs the restoring of data blocks from the target device 102 to the destination device 112, over the network 602.

Figure 7:
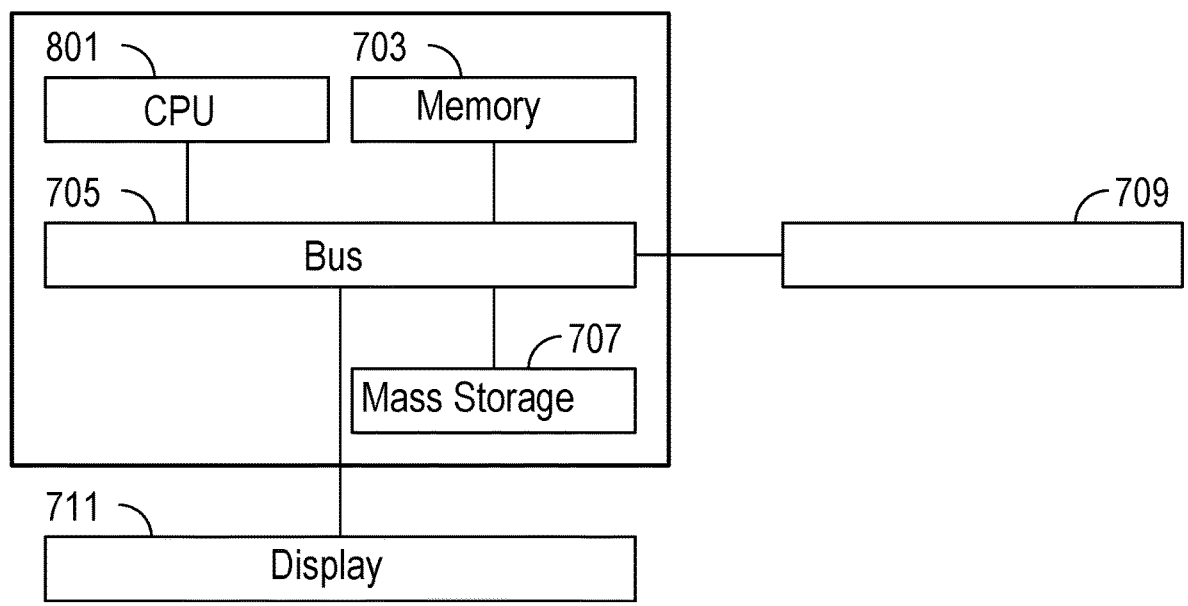
FIG. 7 is an illustration showing an exemplary computing device which may implement embodies described herein.

It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device which may implement the embodiments described herein. The computing device of FIG. 7 may be used to perform embodiments of the functionality for restore sessions in accordance with some embodiments. The computing device includes a central processing unit (CPU) 701, which is coupled through a bus 705 to a memory 703, and mass storage device 707. Mass storage device 707 represents a persistent data storage device such as a floppy disc drive or a fixed disc drive, which may be local or remote in some embodiments. The mass storage device 707 could implement a backup storage, in some embodiments. Memory 703 may include read only memory, random access memory, etc. Applications resident on the computing device may be stored on or accessed via a computer readable medium such as memory 703 or mass storage device 707 in some embodiments. Applications may also be in the form of modulated electronic signals modulated accessed via a network modem or other network interface of the computing device. It should be appreciated that CPU 701 may be embodied in a general-purpose processor, a special purpose processor, or a specially programmed logic device in some embodiments.

Display 711 is in communication with CPU 701, memory 703, and mass storage device 707, through bus 705. Display 711 is configured to display any visualization tools or reports associated with the system described herein. Input/output device 709 is coupled to bus 705 in order to communicate information in command selections to CPU 701. It should be appreciated that data to and from external devices may be communicated through the input/output device 709. CPU 701 can be defined to execute the functionality described herein to enable the functionality described with reference to FIGS. 1-6D. The code embodying this functionality may be stored within memory 703 or mass storage device 707 for execution by a processor such as CPU 701 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system implemented with physical computing resources.

Figure 8:
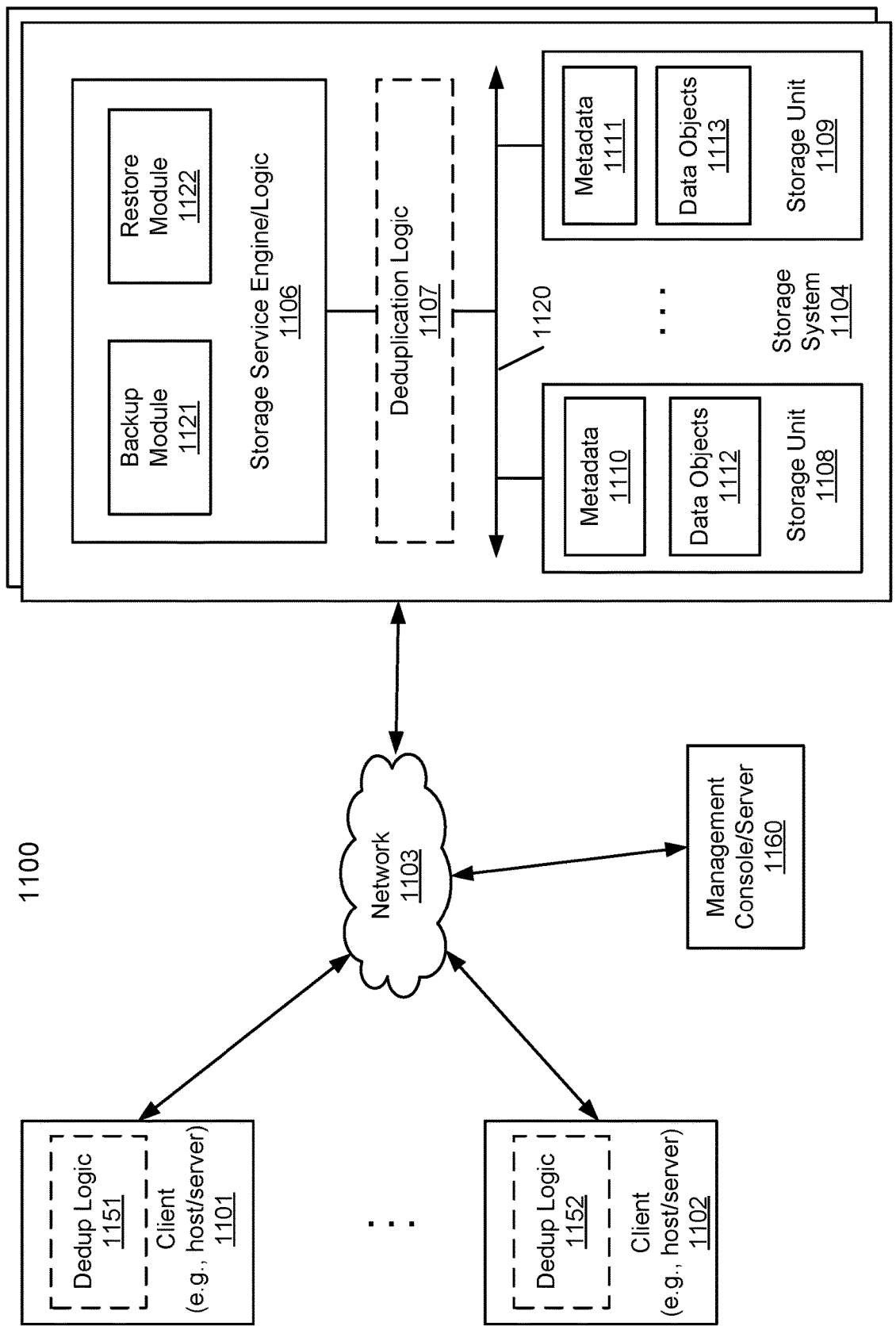
FIG. 8 is a block diagram illustrating an example of a storage system according to one embodiment.

FIG. 8 is a block diagram illustrating a storage system according to one embodiment of the invention. Referring to FIG. 8, system 1100 includes, but is not limited to, one or more client systems 1101-1102 communicatively coupled to storage system 1104 over network 1103. Clients 1101-1102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 1101-1102 may be a primary storage system (e.g., local data center) that provides storage to other local clients, which may periodically back up the content stored therein to a backup storage system (e.g., a disaster recovery site or system), such as storage system 1104. Network 1103 may be any type of networks such as a local area network (LAN), a wide area network (WAN) such as the Internet, a fiber network, a storage network, or a combination thereof, wired or wireless. Clients 1101-1102 may be in physical proximity or may be physically remote from one another. Storage system 1104 may be located in proximity to one, both, or neither of clients 1101-1102. In one embodiment, the hybrid container and the techniques as described above can be implemented in any of the client devices 1101-1102, management server 1160 (e.g., a backup server), and/or storage system 1104.

Storage system 1104 may include or represent any type of servers or a cluster of one or more servers (e.g., cloud servers). For example, storage system 1104 may be a storage server used for various different purposes, such as to provide multiple users or client systems with access to shared data and/or to back up (or restore) data (e.g., mission critical data). Storage system 1104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 1104 may further provide storage services via an object-based protocol and Hadoop distributed file system (HDFS) protocol.

In one embodiment, storage system 1104 includes, but is not limited to, storage service engine 1106 (also referred to as service logic, service module, or service unit, which may be implemented in software, hardware, or a combination thereof), optional deduplication logic 1107, and one or more storage units or devices 1108-1109 communicatively coupled to each other. Storage service engine 1106 may represent any storage service related components configured or adapted to provide storage services (e.g., storage as a service) to a variety of clients using any of the access protocols set forth above. For example, storage service engine 1106 may include backup logic 1121 and restore logic 1122. Backup logic 1121 is configured to receive and back up data from a client (e.g., clients 1101-1102) and to store the backup data in any one or more of storage units 1108-1109. Restore logic 1122 is configured to retrieve and restore backup data from any one or more of storage units 1108-1109 back to a client (e.g., clients 1101-1102).

Storage units 1108-1109 may be implemented locally (e.g., single node operating environment) or remotely (e.g., multi-node operating environment) via interconnect 1120, which may be a bus and/or a network (e.g., a storage network or a network similar to network 1103). Storage units 1108-1109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 1108-1109 may be located locally or remotely accessible over a network.

In response to a data file to be stored in storage units 1108-1109, according to one embodiment, deduplication logic 1107 is configured to segment the data file into multiple segments (also referred to as chunks) according to a variety of segmentation policies or rules. Deduplication logic 1107 may choose not to store a segment in a storage unit if the segment has been previously stored in the storage unit. In the event that deduplication logic 1107 chooses not to store the segment in the storage unit, it stores metadata enabling the reconstruction of the file using the previously stored segment. As a result, segments of data files are stored in a deduplicated manner, either within each of storage units 1108-1109 or across at least some of storage units 1108-1109. The metadata, such as metadata 1110-1111, may be stored in at least some of storage units 1108-1109, such that files can be accessed independent of another storage unit. Metadata of each storage unit includes enough information to provide access to the files it contains.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file do not constitute an entirely new file. The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

Deduplication of data happens in two logically distinct operations: detection and remapping. The detection operation identifies blocks containing the same data. The remapping operation updates address maps that record physical locations of logical units (LUNs) of data so that a single block of data is shared by multiple LUNs or by multiple positions within the same LUN. Detection is accomplished by building a database (e.g., index table) that maintains a digest (e.g., SHA, checksum) and, a deduplication key for each data block. When two data blocks have the same digest they have a sufficiently high probability of containing the same data to warrant a bit-for-bit comparison to confirm they are exact duplicates.

A goal of deduplication logic 1107 is to maintain only a single copy of each unique set of data within a data set. To achieve that goal, deduplication logic 1107 finds data blocks that have not been deduplicated and processes data blocks for deduplication by computing digests for data blocks. A digest is a representation of contents stored in a data block. Further, the digest is mathematically computed (e.g., MD5, SHA-1, SHA-2) in such a way that, computationally, there is a very low or zero probability of finding two data blocks that have the same digest but different contents. If the digest for the data block is sent together with the data block, a recipient of the data block can compute a new digest from the received data block and can compare the new digest with the received digest to determine whether the received data block is valid. Additionally, a digest is stored in an index table in order to process data blocks within the data set for deduplication. Further, a deduplication key identifying a data block is also stored in index table along with the digest for the data block.

A deduplication key uniquely identifies a data block by storing information (such as logical address, physical address) of the data block. Deduplication logic 1107 identifies data blocks that can potentially be deduplicated by comparing digests of data blocks with list of digests stored in the index table. Further, when data blocks are deduplicated after comparing digest information, deduplication logic 1107 updates metadata of deduplicated data blocks. Additionally, deduplication logic 1107 updates metadata of a data block when the data block is reduplicated.

In one embodiment, any of clients 1101-1102 may further include an optional deduplication logic (e.g., deduplication logic 1151-1152) having at least a portion of functionalities of deduplication logic 1107. Deduplication logic 1151-1152 are configured to perform local deduplication operations, respectively. For example, prior to transmit data to storage system 1104, each of the deduplication logic 1151-1152 may deduplicate the data into deduplicated segments and determine whether a particular deduplicated segment has already been stored in storage system 1104. A deduplicated segment is transmitted to storage system 1104 only if the deduplicated segment has not been stored in storage system 1104.

For example, when client 1101 is about to transmit a data stream (e.g., a file or a directory of one or more files) to storage system 1104, deduplication logic 1151 is configured to deduplicate the data stream into deduplicated segments. For each of the deduplicated segments, client 1101 transmits a fingerprint or representative of the deduplicated segment to storage system 1104 to determine whether that particular deduplicated segment has already been stored in storage system 1104. A deduplicated segment that has been stored in storage system 1104 may be previously received from the same client 1101 or from another client such as client 1102. In response to a response from storage system 1104 indicating that the segment has not been stored in storage system 1104, that particular segment is then transmitted over to the storage system 1104. As a result, the network traffic or bandwidth and the processing resources required can be greatly reduced.

In one embodiment, storage system 1104 further includes a storage manager or storage controller (not shown) configured to manage storage resources of storage system 1104, such as, for example, storage space and processing resources (e.g., processor, memory, network resources). The storage manager or controller may be accessed by an administrator of management console or server 1160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A system with uninterrupted block-based restore, comprising:
   a hybrid container comprising an operational buffer and a virtual container unit; and
   one or more processors to perform operations, the operations comprising:
      receiving blocks of data from a target device into the hybrid container and send the blocks of data from the hybrid container to a destination device, responsive to receiving a request for a restore session to restore data to the destination device, wherein the blocks of data from the target device is routed through the operational buffer to the destination device instead of routed through the virtual container, wherein the virtual container only contains information about the blocks of data instead of the blocks of data themselves;
      writing the information about the blocks of data into one or more virtual containers, in the virtual container unit, responsive to receiving the blocks of data by the hybrid container;
      freezing a state of the hybrid container and the one or more virtual containers, responsive to an abort of the restore session; and resuming receiving blocks of data from the target device into the hybrid container, responsive to a next restore session that resumes from where the aborted restore session stopped, sending only leftover blocks of data to the destination device in accordance with the information in the one or more virtual containers.

2. The system of claim 1, wherein the operations further comprise routing, by a restore agent, the blocks of data from the operational buffer of the hybrid container to the destination device.

3. The system of claim 1, wherein the operations further comprise issuing reads to the target device during the next restore session, for only the leftover blocks of data according to the information in the one or more virtual containers.

4. The system of claim 1, wherein the operations further comprise directing the target device not to send blocks of data that have been sent previously through the operational buffer to the destination device during the restore session, according to the information in the one or more virtual containers.

5. The system of claim 1, wherein the operations further comprise discarding, in the next restore session, blocks of data received from the target device that have been sent previously through the operational buffer to the destination device during the restore session, according to the information in the one or more virtual containers.

6. The system of claim 1, wherein the operations further comprise directing, in the next restore session, the hybrid container to bypass blocks of data previously sent through the operational buffer to the destination device during the restore session, according to the information in the one or more virtual containers.

7. The system of claim 1, wherein the operations further comprise directing, in the next restore session, the hybrid container to request only the leftover blocks of data from the target device, according to the information in the one or more virtual containers.

8. A method for uninterrupted block-based restore using a virtual container, the method comprising:
sending blocks of data from a target device to a hybrid container, comprising an operational buffer and a virtual container unit, and from the hybrid container to a destination device, responsive to receiving a request for a restore session, wherein the blocks of data from the target device is routed through the operational buffer to the destination device instead of routed through the virtual container, wherein the virtual container only contains details for the blocks of data instead of the blocks of data themselves;
writing the details for the blocks of data into one or more virtual containers, in the virtual container unit, responsive to receiving the blocks of data by the hybrid container;
freezing state of the hybrid container and the one or more virtual containers, responsive to an abort of the restore session; and
resuming the sending the blocks of data from the target device to the hybrid container, responsive to a next restore session that resumes from where the aborted restore session stopped, with only leftover blocks of data routed to the destination device in accordance with contents of the one or more virtual containers.

9. The method of claim 8, further comprising routing, by a restore agent, the blocks of data from the operational buffer of the hybrid container to the destination device.

10. The method of claim 8, wherein the resuming the sending the blocks of data with only leftover blocks of data routed to the destination device comprises:
issuing reads, from the hybrid container to the target device, for only the leftover blocks of data according to the contents of the one or more virtual containers.

11. The method of claim 8, wherein the resuming the sending the blocks of data with only leftover blocks of data routed to the destination device comprises:
directing, from the hybrid container, that the target device not send blocks of data that have been sent previously through the operational buffer to the destination device during the restore session, according to the contents of the one or more virtual containers.

12. The method of claim 8, wherein the resuming the sending the blocks of data with only leftover blocks of data routed to the destination device comprises:
discarding, by the hybrid container, blocks of data received at the hybrid container from the target device that have been sent previously through the operational buffer to the destination device during the restore session, according to the contents of the one or more virtual containers.

13. The method of claim 8, wherein the resuming the sending the blocks of data with only leftover blocks of data routed to the destination device comprises:
directing, by a restore agent, the hybrid container to bypass blocks of data previously sent through the operational buffer to the destination device during the restore session, according to the contents of the one or more virtual containers.

14. The method of claim 8, wherein the resuming the sending the blocks of data with only leftover blocks of data routed to the destination device comprises:
directing, by a restore agent, the hybrid container to read only the leftover blocks of data from the target device, according to the contents of the one or more virtual containers.

15. A non-transitory computer-readable medium having instructions thereupon which, when executed by a processor, cause the processor to:
route blocks of data from a target device through a hybrid container, comprising an operational buffer and a virtual container unit, to a destination device, responsive to receiving a request for a first restore session, wherein the blocks of data from the target device is routed through the operational buffer to the destination device instead of routed through the virtual container, wherein the virtual container only details for the blocks of data instead of the blocks of data themselves;
write the details for the blocks of data into one or more virtual containers, in the virtual container unit, responsive to routing the blocks of data through the hybrid container;
freeze state of the hybrid container, including the one or more virtual containers, responsive to an abort of the first restore session; and
resume routing the blocks of data from the target device through the hybrid container to the destination device, responsive to a second restore session that resumes from where the aborted first restore session stopped, with only leftover blocks of data routed to the destination device in accordance with contents of the one or more virtual containers.

16. The computer-readable medium of claim 15, wherein the instructions further cause the processor to:

request, from the hybrid container to the target device, only the leftover blocks of data according to the contents of the one or more virtual containers, during the second restore session.

17. The computer-readable medium of claim 15, wherein the instructions further cause the processor to:
  direct, from the hybrid container, during the second restore session, that the target device not send blocks of data that have been routed previously through the operational buffer to the destination device during the first restore session, according to the contents of the one or more virtual containers.

18. The computer-readable medium of claim 15, wherein the instructions further cause the processor to:
  discard, by the hybrid container during the second restore session, blocks of data received at the hybrid container from the target device that have been routed previously through the operational buffer to the destination device during the first restore session, according to the contents of the one or more virtual containers.

19. The computer-readable medium of claim 15, wherein the instructions further cause the processor to:
  direct, by a restore agent during the second restore session, the hybrid container to bypass blocks of data previously sent through the operational buffer to the destination device during the first restore session, according to the contents of the one or more virtual containers.

20. The computer-readable medium of claim 15, wherein the instructions further cause the processor to:
  direct, by a restore agent during the second restore session, the hybrid container to read only the leftover blocks of data from the target device, according to the contents of the one or more virtual containers.

* * * * *